(12) United States Patent
Huang

(10) Patent No.: US 10,486,652 B2
(45) Date of Patent: Nov. 26, 2019

(54) BEAM WIPER STRUCTURE WITH MULTIFUNCTIONAL ADAPTERS

(71) Applicant: Jiangsu Yunrui Automotive Electrical Systems Co., LTD., Xuzhou, Jiangsu Province (CN)

(72) Inventor: Songlin Huang, Xuzhou (CN)

(73) Assignee: Jiangsu Yunrui Automotive Electrical System Co., Ltd., Xuzhou (CN)

( * ) Notice: Subject to any disclaimer, the term of this patent is extended or adjusted under 35 U.S.C. 154(b) by 86 days.

(21) Appl. No.: 15/482,066

(22) Filed: Apr. 7, 2017

(65) Prior Publication Data

US 2018/0186340 A1 Jul. 5, 2018

(30) Foreign Application Priority Data

Jan. 5, 2017 (CN) .......................... 2017 1 00007611

(51) Int. Cl.
 *B60S 1/40* (2006.01)
 *B60S 1/38* (2006.01)

(52) U.S. Cl.
 CPC ........... *B60S 1/4003* (2013.01); *B60S 1/3881* (2013.01); *B60S 1/381* (2013.01); *B60S 1/4009* (2013.01); *B60S 1/4074* (2013.01); *B60S 1/4083* (2013.01); *B60S 1/4087* (2013.01); *B60S 2001/408* (2013.01); *B60S 2001/4022* (2013.01); *B60S 2001/4029* (2013.01); *B60S 2001/4051* (2013.01); *B60S 2001/4058* (2013.01)

(58) Field of Classification Search
 CPC ...... B60S 1/381; B60S 1/3849; B60S 1/3868; B60S 1/4003; B60S 1/4045; B60S 1/4048; B60S 1/4009; B60S 1/4016; B60S 2001/4022; B60S 2001/4058; B60S 2001/4064; B60S 2001/4051; B60S 2001/4035; B60S 2001/4029; B60S 2001/4032; B60S 1/4083; B60S 1/4074; B60S 2001/408; B60S 1/4087
 USPC ................. 15/250.32, 250.201, 250.43
 See application file for complete search history.

(56) References Cited

U.S. PATENT DOCUMENTS

| | | | |
|---|---|---|---|
| 2010/0005609 A1* | 1/2010 | Kim ................... | B60S 1/387 15/250.32 |
| 2014/0259504 A1* | 9/2014 | Piotrowski ............ | B60S 1/4003 15/250.32 |
| 2015/0329087 A1* | 11/2015 | Young, III .............. | B60S 1/381 15/250.201 |
| 2016/0059829 A1* | 3/2016 | Poton .................... | B60S 1/4009 15/250.32 |

* cited by examiner

*Primary Examiner* — Gary K. Graham
(74) *Attorney, Agent, or Firm* — Bay State IP, LLC

(57) ABSTRACT

A new beam wiper structure with multi-functional adaptor is disclosed by this invention. Such structure consists of Wiper joint, Adaptor I, Adaptor II, holder, Adaptor Cover I, Adaptor Cover II, two buckles, two flow deflectors, two springs and one rubber. The feature is that: Bearing shaft is installed on the support. The bearing shaft is of semi-hollow structure with one end closed, and equipped with an internal guide pillar casing. It is clamped into connecting hole for Adaptor I on bearing shaft. In addition, slideway is fitted at the bottom edge of Adaptor I, one inside end of Adaptor Cover I is fitted with groove and cushion block. The groove in Adaptor Cover I will rotate in coordination with the shaft of Adaptor I.

15 Claims, 19 Drawing Sheets

BEAM WIPER STRUCTURE WITH MULTIFUNCTIONAL ADAPTERS

CROSS REFERENCE TO RELATED APPLICATION

This application claims the benefit of and takes priority from Chinese Patent Application No. 2017100007611.2 filed on Jan. 5, 2017, the contents of which are herein incorporated by reference.

TECHNICAL FIELD

The invention relates to the shape and the assembly and connection mode of a new beam wiper with multi-functional adaptors, especially a new beam wiper structure with multi-functional adaptors.

TECHNICAL BACKGROUND

With continuous optimization and development of the automobile wiper system, the customers impose increasingly higher requirements on wipers, and the development of wipers tends to be diversified. As the wiper types increase continuously, the supporting adaptors for wipers also become varied in the market. To install supporting wipers for cars, the customers often spend a lot of time on determining the matching between wipers and automobile adaptors. Moreover, owning to the monotonous design of wiper adaptors, the customers can use a single type of wipers only, which limits the customers' right to select wiper products of other types. The monotonous structure of wiper adaptors is unfavorable for the consumers to get more and better using experience.

SUMMARY OF THE INVENTION

The invention aims to overcome the inferiority of existing technologies and provide a new beam wiper structure with multi-functional adaptors. Different from the single matching mode of traditional wiper adaptors, the new structure integrates multiple matching modes. Without changing adaptors, the structure can be assembled on various wipers to realize the perfect match. The structure not only allows the customers to have more choices when replacing the wiper without any additional adaptor, but also can save the cost for replacement of adaptors.

The invention adopts the technical scheme of a new beam wiper structure with multi-functional adaptors, including wiper joint, adaptor I, adaptor II, a holder, adaptor cover I, adaptor cover II, two buckles, two flow deflectors, two springs and a rubber. The spring hole is set on the flow deflector while the rubber groove. The rubber fixture blocks are furnished at both ends of rubber. Characteristics are described as below: the holder convex hulls are set at both sides of the middle at the bottom of holder; the pressing block is set at the top of one end at the bottom of holder; the spring slot is set on the other end at the bottom of holder; the buckle slot is set inside the buckle; the spring terminal is set at both ends of spring. The adaptor I connecting hole is furnished on adaptor I. The holder is installed with bearing shaft which is subject to semi-hollow structure with one end enclosed, including guide pillar casing. Chambers are set at both ends of bearing shaft. The step-down groove is provided at one side of bearing shaft. The bearing shaft is inserted into adaptor I connecting hole for fixation and connection. The holder also plays a role of diversion.

Adaptor I is installed with convex hull, convex block I, convex block II, pressing block, connecting hole, groove convex block, cushion block groove, shaft, buckle I and slideway. The connecting hole is provided at one side of adaptor I connecting hole. The axial compression groove is furnished below connecting hole. The slideway is located on the edge at the bottom of adaptor I. Convex block II is positioned outside the slideway.

The pressing block is furnished on one end at the top of adaptor I. U-shaped column and convex block are provided at the inside middle of adaptor I. The groove convex block is located at one side of convex block. Buckle I is positioned at both sides of the other end of adaptor I.

Groove and cushion block are set inside one end of adaptor cover I. The side groove is installed at both middle sides of adaptor cover I. The groove inside adaptor cover I and the shaft of adaptor I (B1I) rotate coordinately. Buckle I can be pressed into the side groove by pressing down adaptor cover I for fixation.

Fixture blocks are set at both front outsides of adaptor II. The holder holes and shaft holes are provided in the middle. Blocks are furnished at both sides at the bottom of adaptor II. Shaft I is located at the upper end of adaptor II and convex plate I is positioned at the other end. Convex hull II is symmetrically set at the upper inside of adaptor II. Adaptor cover II is installed on adaptor II. C-type shaft groove and convex plate I are assembled at one end inside adaptor cover II. Side groove I is provided at both outsides of adaptor cover II.

The mentioned adaptor I and adaptor II are designed with various matching modes. They can be matched with ten types of wiper joints.

The mentioned wiper joints are 9*3 U-hook, 9*4 U-hook, pinch tab 22, top lock 22, side lock 22, side pin, pinch tab button, side lock 17, top lock 16 and bayonet. They have been launched into the market for sales.

The mentioned pinch tab is designed with convex block at the top end and slots at both sides. The mentioned pinch tab button is set with fixing holes. The convex block is located at the top end. The pressing block is positioned in the middle.

The mentioned side pin is set with shaft I on one side at the top, and the shaft is provided with connecting shaft.

The mentioned side lock 17 is designed with L-shaped hook A801. Connecting shaft I is provided at one side of L-shaped hook.

The top lock 22 is furnished with L-shaped slot.

The top lock 16 is designed with a square convex plate hole. The four groups of convex hull II are furnished at the bottom of hook plate type joint. The top lock 22 is furnished with L-shaped slot.

The mentioned bayonet is set with fixing hole at one end and round convex plate hole in the middle.

Scheme I: clamp 9*3 U-hook (AI) into U-shaped column (B102), and then fix and limit it with convex block (B100).

Scheme II: clamp 9*4 U-hook into U-shaped column, and then fix and limit it with convex block;

Scheme III: clamp the pinch tab into convex hull, and then press down to fix it on the groove convex block;

Scheme IV: penetrate the top lock 22 into adaptor I along the slideway, and prevent the top lock 22 from moving back and forth with convex block II and convex block I;

Scheme V: match up the side lock 22 and adaptor I, and then insert the side lock 22 into guide pillar casing of holder bearing shaft for fixation.

Scheme IV: match up the side pin and adaptor I, and then insert the side pin into connecting hole for connection and fixation. Rotate the groove inside adaptor cover I together with the adaptor I and adaptor cover I coordinately through connecting shaft. Press the adaptor cover I downward to make the buckle into groove for fixation;

Scheme VII: match up the pinch tab button and adaptor I; the pinch tab button is designed with slot I, top convex block and fixture block I; insert slot I into convex hull of adaptor I; clamp fixture block I below pressing block; press the pinch tab button downward to clamp the top convex block into groove convex block of adaptor. The assembly is completed.

Scheme VIII: match up the side lock 17 and adaptor II; the side lock 17 is designed with L-shaped hook and connecting shaft I; insert connecting shaft I into shaft hole of adaptor II; clamp L-shaped hook on adaptor II for fixation;

Scheme IX: match up the top lock 16 and adaptor II; the top lock 16 is designed with convex hull II and square convex plate hole. Penetrate the top lock 16 into adaptor II. Prevent the top lock 16 from moving up and down with the four groups of convex hull II structure. Limit the direction of forward motion with blocks. Clamp the convex plate into square convex plate hole to avoid dropping out.

Scheme X: match up the bayonet and adaptor II, clamp convex hull I into round convex hull hole, prevent it from swaying left and right with the four groups of convex hull I, press down adaptor cover II at the end, and press the cushion block at the point of A to prevent moving up and down.

The invention obtains the following beneficial effects from above technical schemes: the adaptor integrates the matching modes and advantages of ten types of adaptors; it is applicable to most adaptors in the market; the wide range of application and high adaptability can meet the requirements of more customers.

DESCRIPTION OF FIGURES

The invention is further described in combination with figures and embodiments.

DETAILED DESCRIPTION OF THE SEVERAL EMBODIMENTS

Figure 1:
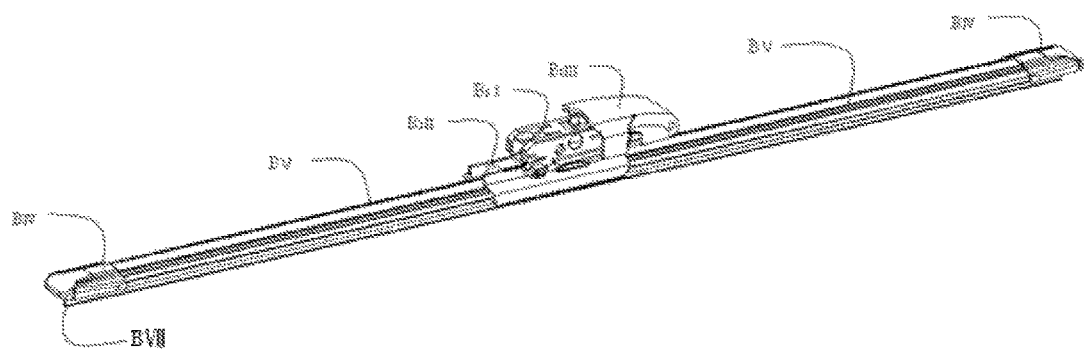
FIG. 1 is the overall assembly drawing of the invention.
Figure 2:
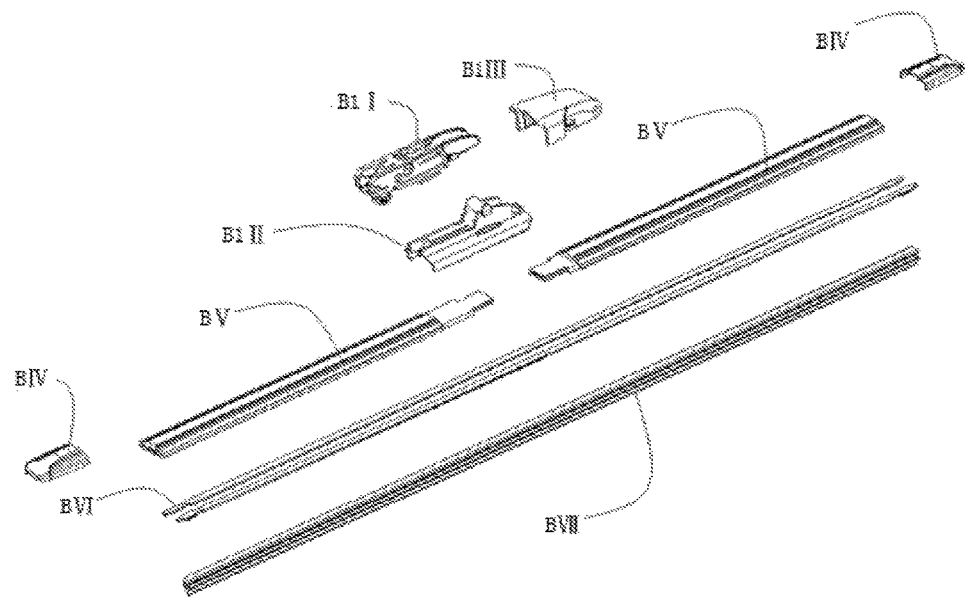
FIG. 2 is the exploded drawing of FIG. 1.
Figure 3:
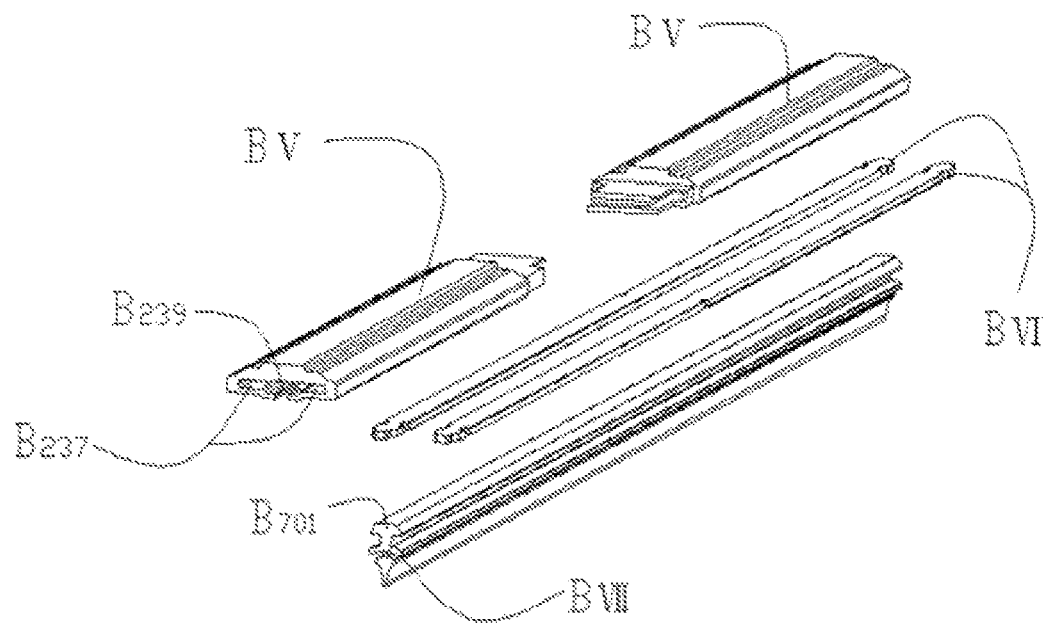
FIG. 3 and FIG. 4 are the spring and rubber assembly drawings of FIG. 2.
Figure 4:
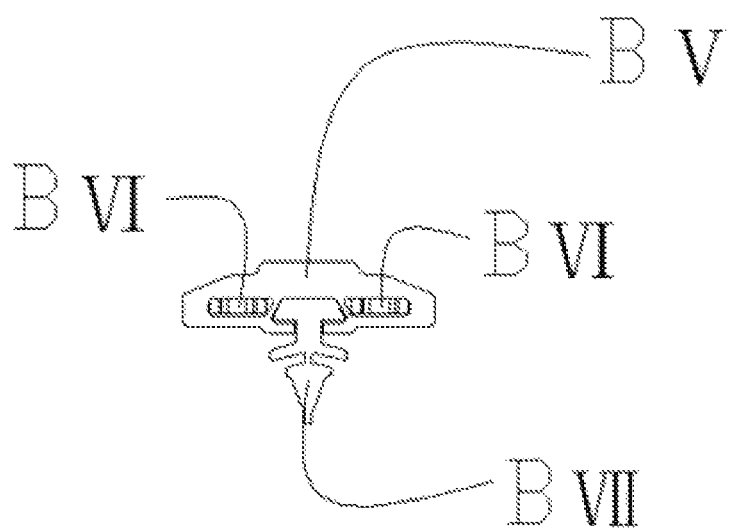
Figure 5:
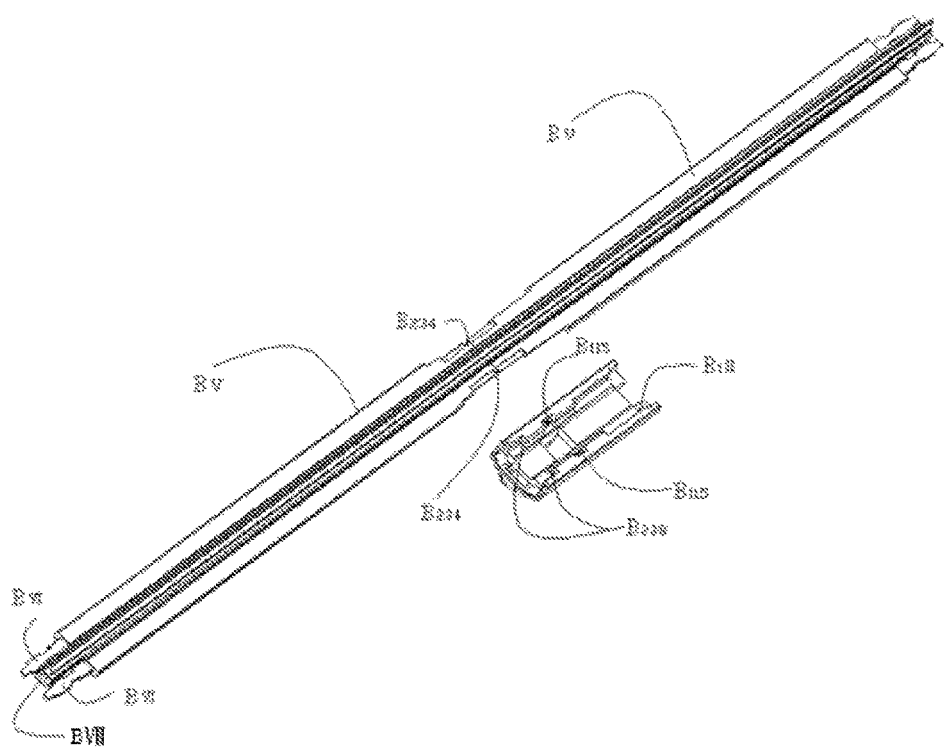
FIG. 5 and FIG. 6 are the holder assembly drawings of FIG. 2.
Figure 6:
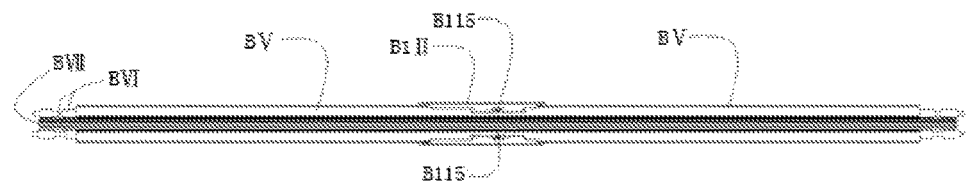
Figure 7:
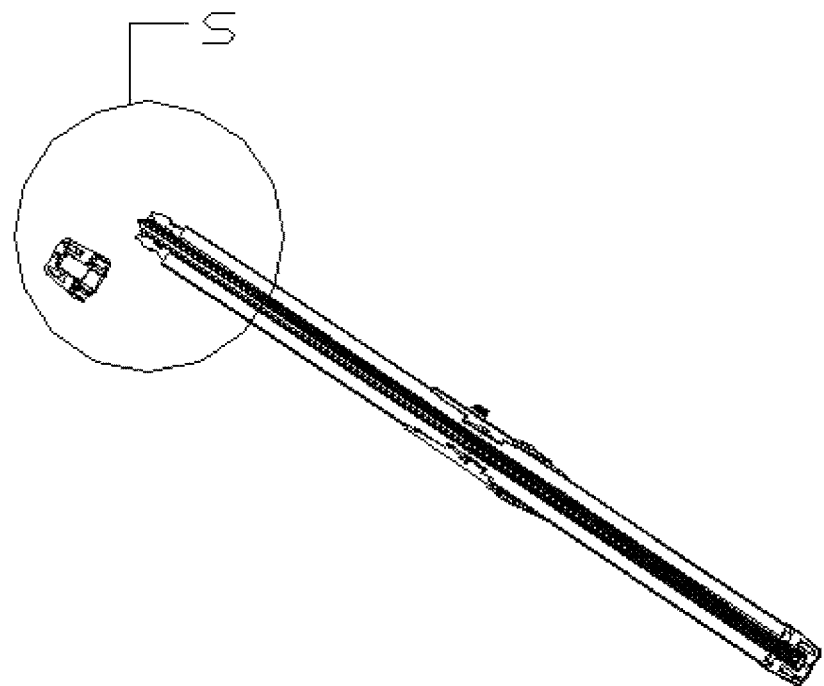
FIG. 7 is the buckle assembly drawing of FIG. 1.
Figure 8:
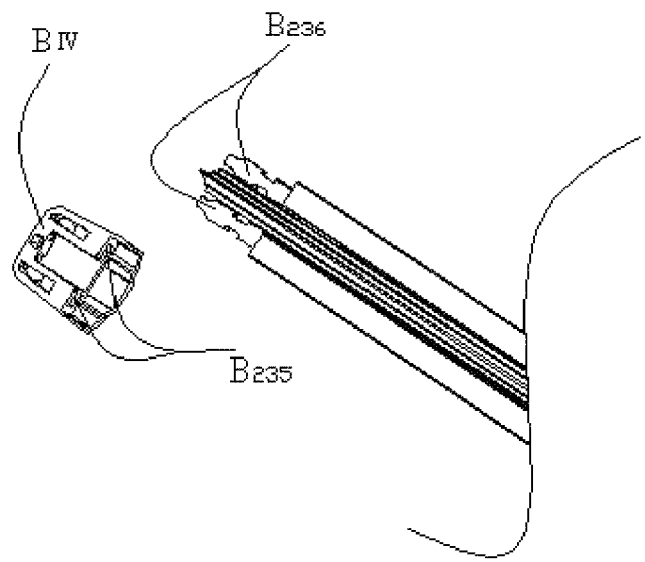
FIG. 8 is the enlarged drawing of position S in FIG. 7.
Figure 9:
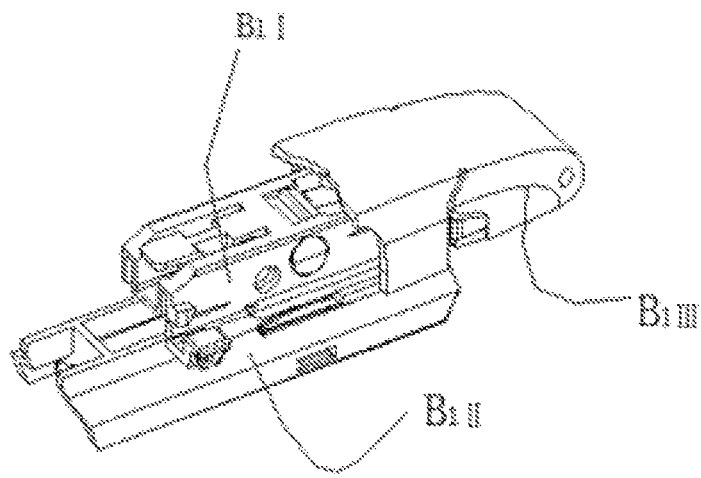
FIG. 9 is the general drawing of adaptor I.

In figures, (B1I) adaptor I, (B2I) adaptor II, (B1II) holder, (B1III) adaptor cover I, (B2III) adaptor cover II, (BIV) buckle, (BV) flow deflector, (BVI) spring, (BVII) rubber, (AI) 9*3 U-hook, (AII) 9*4 U-hook, (AIII) pinch tab, (AIV) top lock 22, (AV) side lock 22, (AVI) side pin, (AVII) pinch tab button, (AVIII) side lock 17, (AIX) top lock 16, (AX) bayonet, (B100) U-shaped column, (B101) adaptor connecting hole, (B102) U-shaped column, (B103) convex hull I, (B104) convex plate I, (B105) connecting hole, (B106) shaft, (B107) groove convex block, (B108) convex plate, (B109) slideway, (B110) convex block II, (B111) pressing block, (B112) axial compression groove, (B113) buckle, (B114) cushion block groove, (B115) holder convex hull, (B121) bearing shaft, (B122) step-down groove, (B123) guide pillar casing, (B131) groove I, (B132) side groove, (B133) cushion block, (B200) holder hole, (B201) shaft I, (B202) fixture block, (B203) shaft hole, (B204) block, (B205) convex hull I, (B206) convex plate I, (B207) holder hole, (B231) side groove I, (B232) cushion block, (B233) C-type shaft groove, (B234) spring groove, (B235) buckle groove, (B236) spring terminal, (B237) spring hole, (B238) spring groove, (B239) rubber groove, (B701) rubber fixture block, (A301) slot, (A302) top convex block, (A401) L-shaped slot, (A501) L-shaped hook, (A502) guide pillar, (A601) shaft I, (A602) connecting shaft, (A701) slot I, (A702) top convex block, (A703) fixture block IV, (A801) L-shaped hook, (A802) connecting shaft I, (A901) convex hull II, (A902) square convex plate hole, (A1001) round convex plate hole.

Specific Implementation Method
Wiper Assembly Schemes
Refer to FIG. 1, FIG. 2, FIG. 3, FIG. 4, FIG. 5, FIG. 6, FIG. 7 and FIG. 8.

The invention includes wiper joint, a holder (B1II), two flow deflectors (BV), two buckles (BIV), two springs (BVI) and a rubber (BVII). The spring hole (B237) is set on the flow deflector. The rubber groove (B239) is set inside the flow deflector (BV). The rubber fixture block (B701) is furnished at both ends of rubber (BVII). The holder convex hull (B115) is set at both sides of the middle at the bottom of holder (B1II). The pressing block (B111) is set at the top of one end at the bottom of holder (B1II). The spring slot (B238) is set on the other end at the bottom of holder; the buckle slot (B235) is set inside the buckle. The spring terminal (B236) is set at both ends of spring. Penetrate two springs (BVI) into the spring holes (B237) of flow deflector (BV). Penetrate the rubber (BVII) into the rubber groove (B239) of flow deflector (BV) to complete the assembly of spring, rubber and flow deflector. Clamp the spring (BVI) into the spring slot (B238) of holder (B1II). Clamp the convex hull (B115) of holder (B1II) into groove of spring (BVI). Fix the spring (BVI) with spring slot (B238) to prevent swaying left and right. Avoid the spring (BVI) moving back and forth with holder convex hull (B115). Buckle (BIV) contains buckle slot (B235). Clamp the spring terminal (B236) into buckle slot. Fix both ends of spring to clamp the rubber tightly with spring.

Refer to FIG. 9, FIG. 11, FIG. 16 and FIG. 17. Adaptor I (B1I) is designed with adaptor I connecting hole (B101). Holder (B1II) is installed with bearing shaft (B121) which is subject to semi-hollow structure with one end enclosed. Chambers are set at both ends of bearing shaft (B121). Step-down groove (B122) is set at one side of bearing shaft (B121). Bearing shaft (B121) is clamped into adaptor I connecting hole (B101) for fixation and connection. Holder (B1II) also plays a role of diversion.

Adaptor I is also set with convex hull (B103), convex block I (B104), convex block II (B110), pressing block (B111), connecting hole (B105), groove convex block (B107), cushion block groove (B114), shaft (B106), buckle I (B113) and slideway (B109). The connecting hole (B105) is set at one side of adaptor I connecting hole (B101). The axial compression groove (B112) is set below connecting hole (B105). The slideway (B109) is set at the bottom edge of adaptor I (B1II). Convex block II is set outside of slideway (B109).

The pressing block (B111) is furnished on one end at the top of adaptor I (B1II). U-shaped column (B102) and convex block (B100) are provided at the inside middle of adaptor I (B1II). The groove convex block (B107) is located at one side of convex block (B100). Buckle I (B113) is positioned at both sides of the other end of adaptor I (B1II).

Groove (B131) and cushion block (B133) are set inside one end of adaptor cover I (B1III). The side groove (B132) is installed at both middle sides of adaptor cover I (B1III). The groove (B131) inside adaptor cover I (B1III) and the shaft (B106) of adaptor I (B1I) can rotate coordinately. Buckle I (B113) can be pressed into the side groove (B132) by pressing down adaptor cover I (B1III) for fixation.

Figure 10:
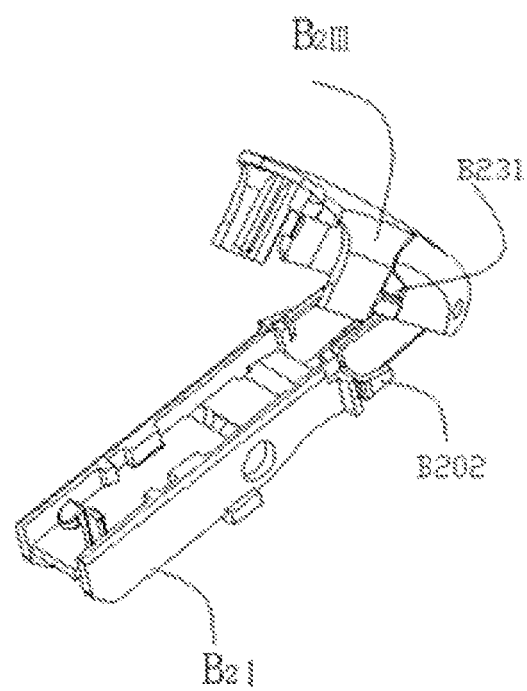
FIG. 10 is the general drawing of adaptor II.
Figure 11:
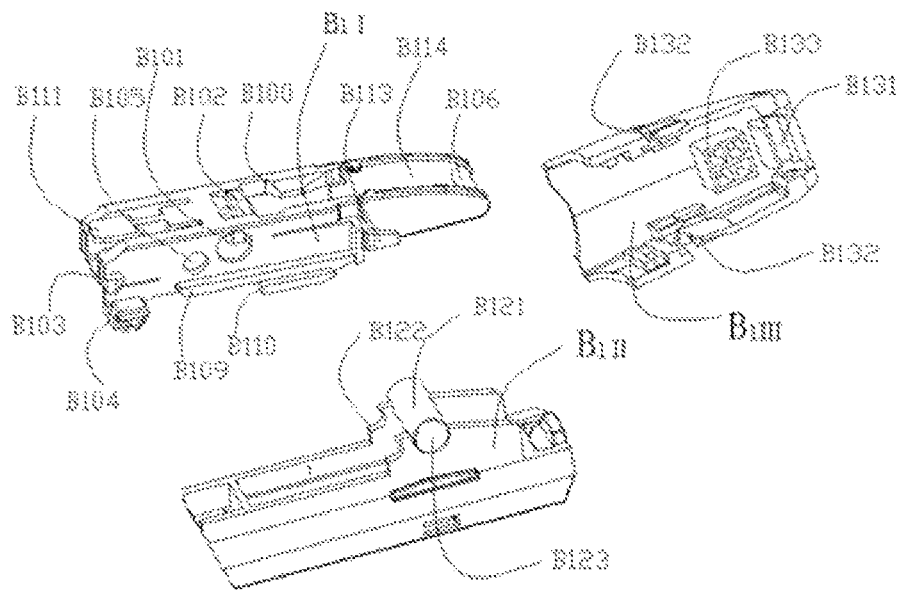
FIG. 11 is the exploded drawing of FIG. 9.
Figure 12:
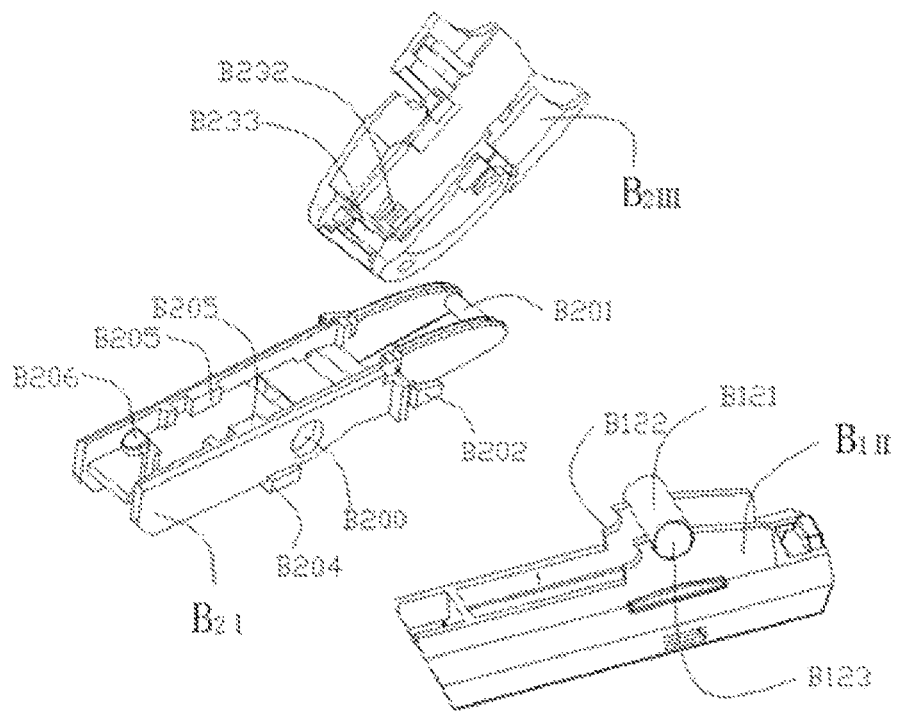
FIG. 12 is the exploded drawing of FIG. 10.
Figure 13:
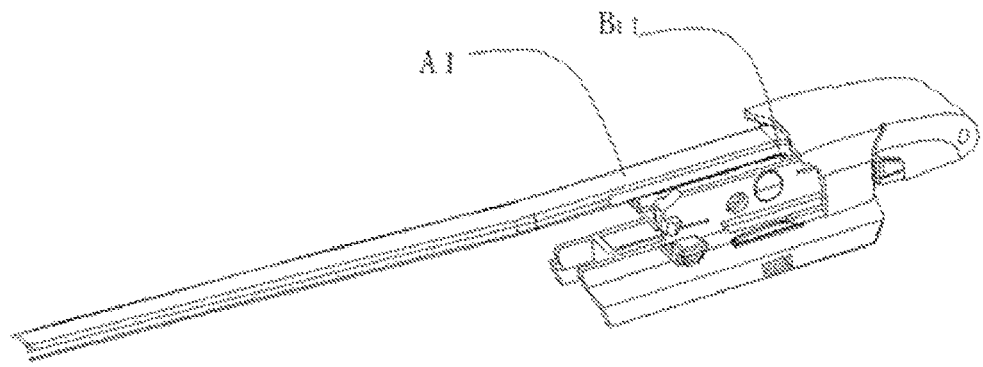
FIG. 13 is the assembly rendering of 9*3U-hook and adaptor I in scheme I.
Figure 14:
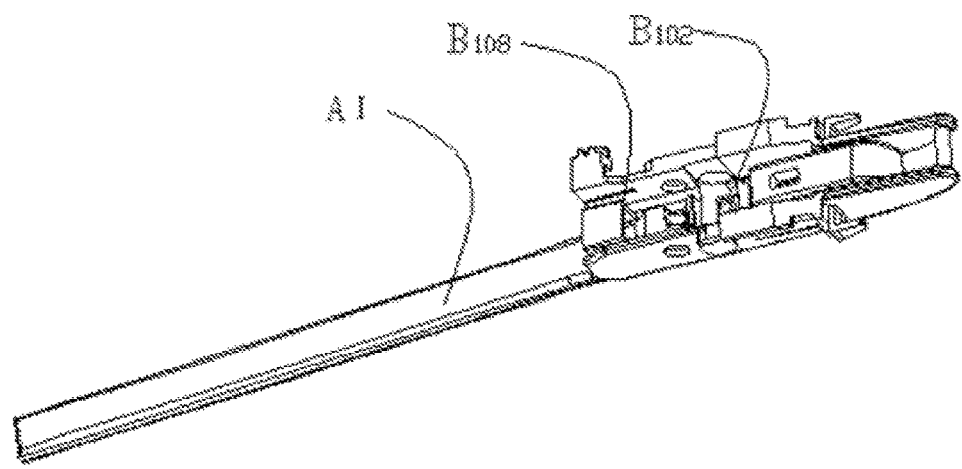
FIG. 14 is the bottom view of FIG. 13.
Figure 15:
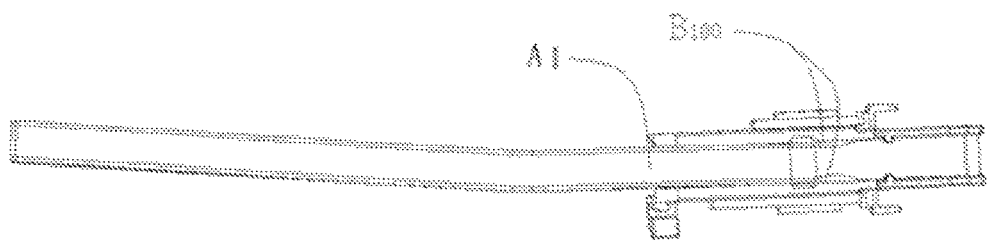
FIG. 15 is the top view of FIG. 13.
Figure 16:
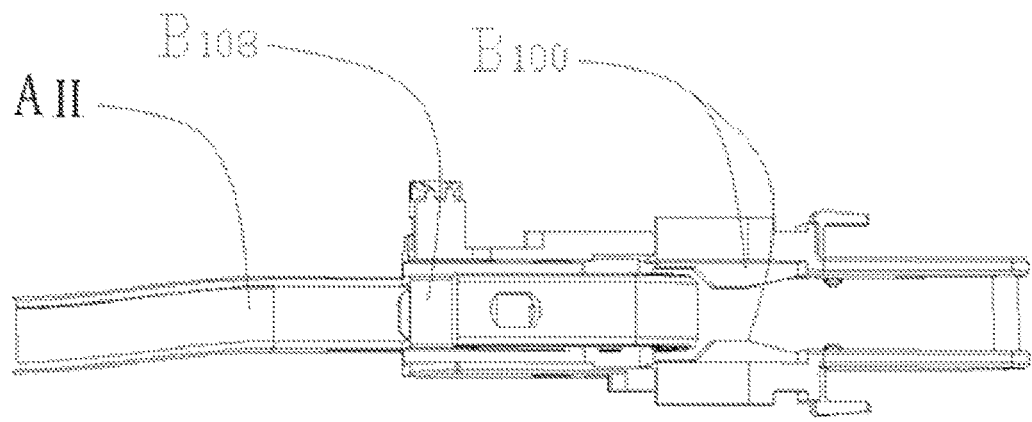
FIG. 16 is the assembly rendering of 9*4U-hook and adaptor I in scheme II.
Figure 17:
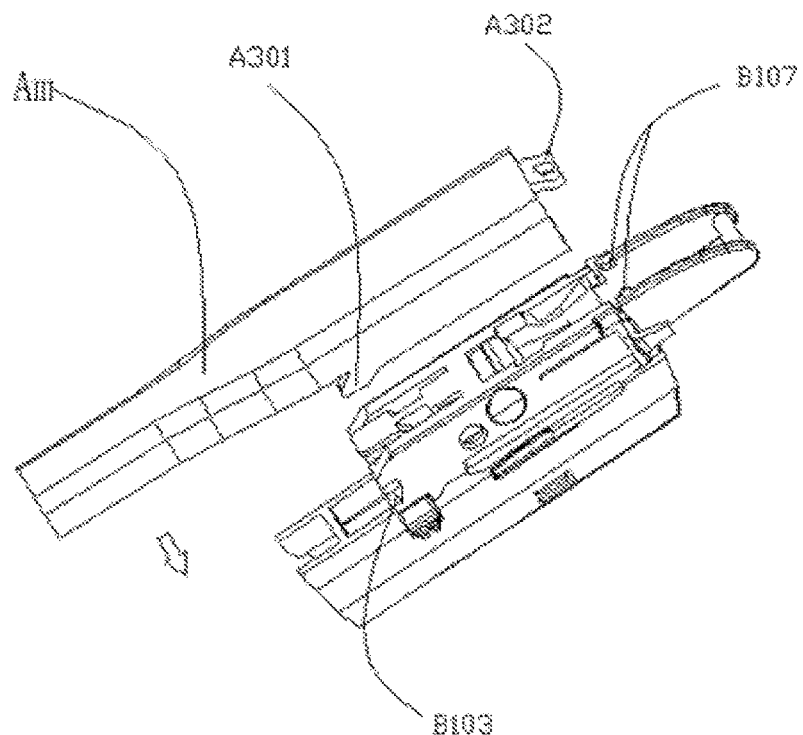
FIG. 17 is the assembly structure drawing of pinch tab and adaptor I in scheme III.
Figure 31:
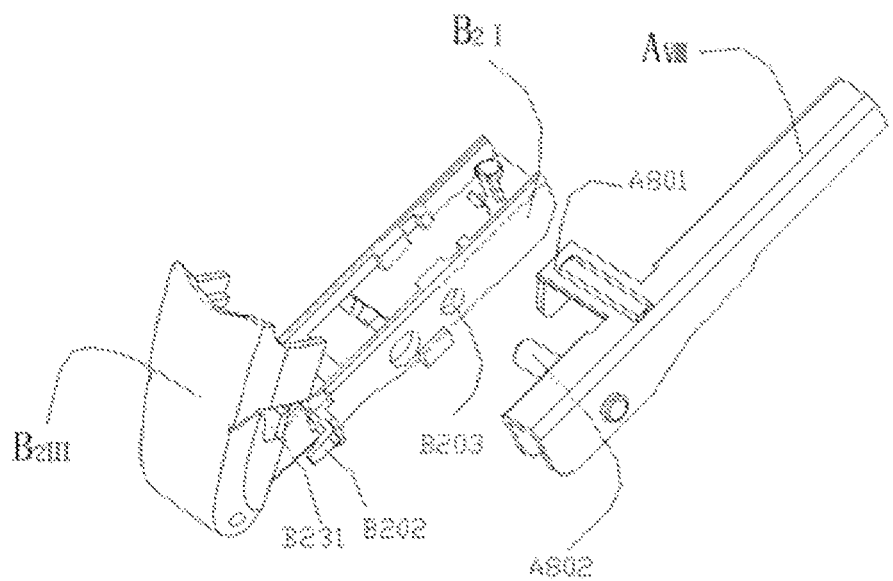
FIG. 31 is the assembly structure diagram of side lock and adaptor II and adaptor cover II in scheme VIII.
Figure 32:
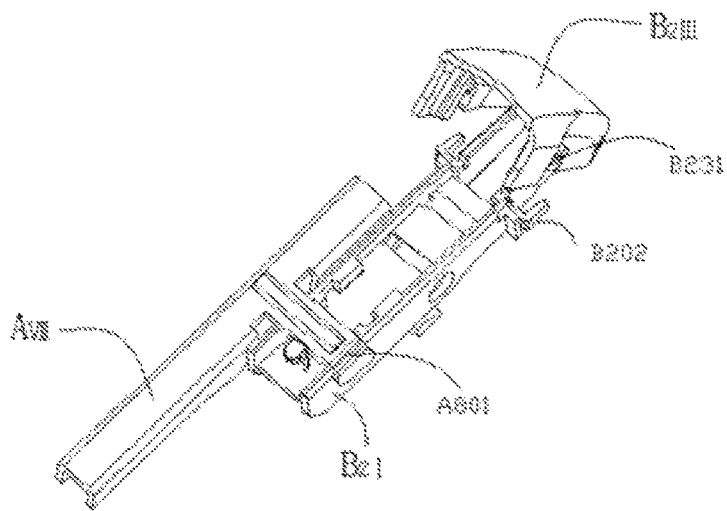
FIG. 32 is the structure diagram of assembly in FIG. 31.

Refer to FIG. 10, FIG. 12 and FIG. 31. Fixture blocks (B202) are set at both front outsides of adaptor II (B2I). The holder hole (B200) and shaft hole (B203) are provided in the middle. Block (B204) is furnished at both sides at the bottom of adaptor II (B2I). Adaptor II (B2I) is set with shaft I (B201) at one end and convex plate I (B206) at the other end on the top. Convex hull III (B205) is set symmetrically at the top of inside adaptor II (B2I). Adaptor II (B2I) is installed with adaptor cover II (B2III) which is set with C-shaped shaft groove (B233) and cushion block I (B232) at one end on the inner side. The adaptor cover II (B2III) is provided with side groove I (B231) at both ends on the outer side.

The mentioned adaptor I (B1II) and adaptor II (B2I) have various matching structures, and they can be matched with 10 types of wiper joints.

The mentioned wiper joints include 9*3 U-hook, 9*4 U-hook, pinch tab 22 (AIII), top lock 22 (AIV), side lock 22 (AV), side pin (AVI), pinch tab button (AVII), side lock 17 (AVIII), top lock 16 (AIX), and bayonet (AX). They have been launched into the market for sales.

Scheme I:
Match up 9*3 U-hook (AI) and adaptor I with reference to FIG. 11, FIG. 13, FIG. 14 and FIG. 15. Clamp the shaft (B106) of adaptor I (B1I) into the groove (B131) of adaptor cover I (B1III) to keep the adaptor cover I (B1III) rotating freely along the shaft (B106). After assembly, press down adaptor cover I (B1III). Clamp the buckle (B113) into adaptor cover I (B1III). Holder both walls of cushion block groove (B114) with cushion block (B133). After assembly of adaptor I, clamp U-shaped hook of 9*3U-hook (AI) into U-shaped column (B102). Prevent 9*3 U-hook (AI) from moving with convex block (B100) to ensure firm connection.

Scheme II:
Match up 9*4 U-hook (AII) and adaptor I (B1I) with reference to FIG. 15. Clamp (AII) 9*4 U-hook into adaptor I (B1I). Keep the top end of 9*4 U-hook (AII) contacting convex plate (B108). Prevent 9*4 U-hook (AII) from moving back and forth with convex block (B100).

Figure 18:
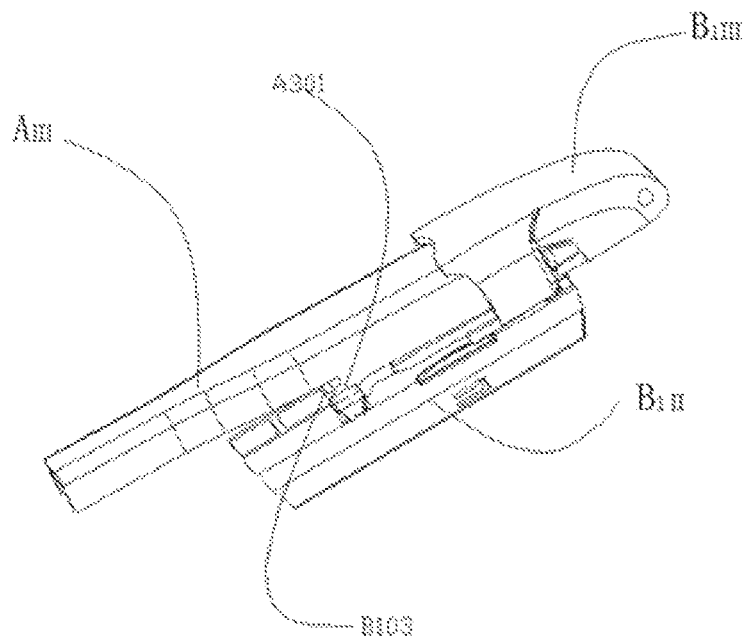
FIG. 18 is the assembly structure diagram of FIG. 17.

Scheme III:
Match up the pinch tab (AIII) and adaptor I (B1I) with reference to FIG. 17 and FIG. 18. The mentioned pinch tab is designed with convex block (A302) at the top and slot (A301) at both sides. Clamp the slot (A301) into convex hull (B103) of adaptor I (B1I). Meanwhile, press down pinch tab (AIII). Clamp the top convex block (A302) into groove convex block (B107) of adaptor I (B1I). The assembly is completed.

Figure 19:
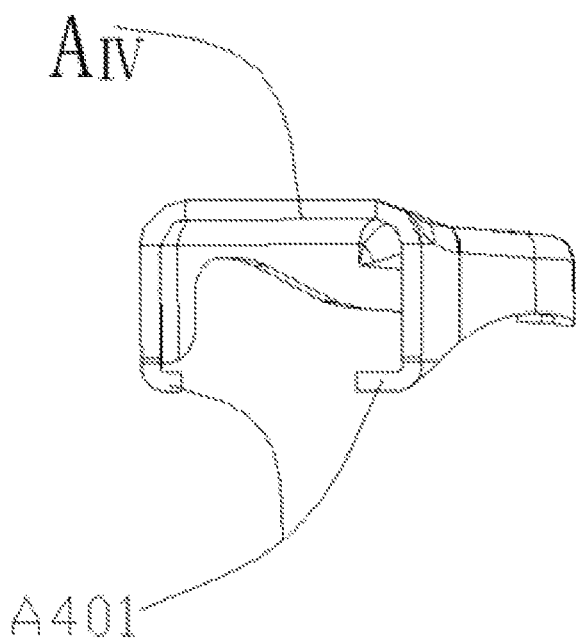
FIG. 19 is the structure diagram of top lock 22.
Figure 20:
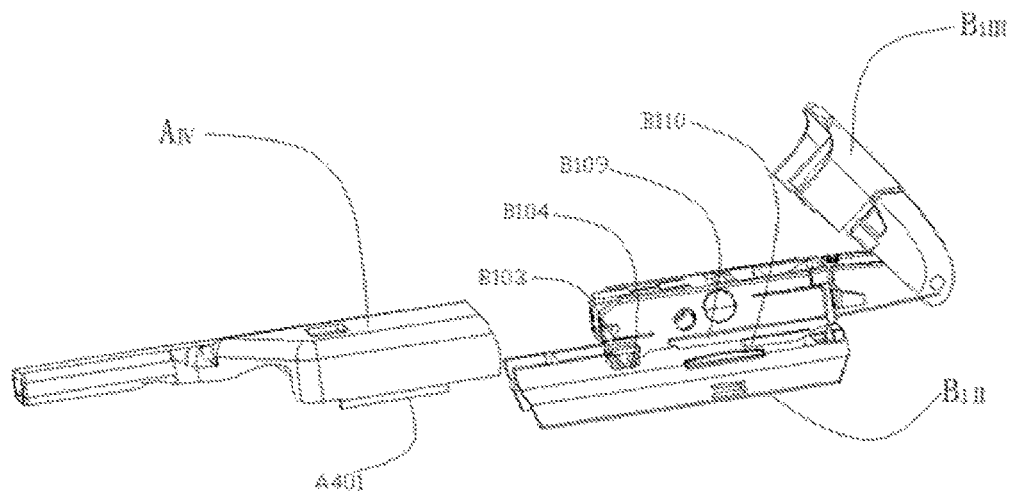
FIG. 20 is the disassembly and assembly structure diagram of top lock 22 and adaptor I in scheme IV.
Figure 21:
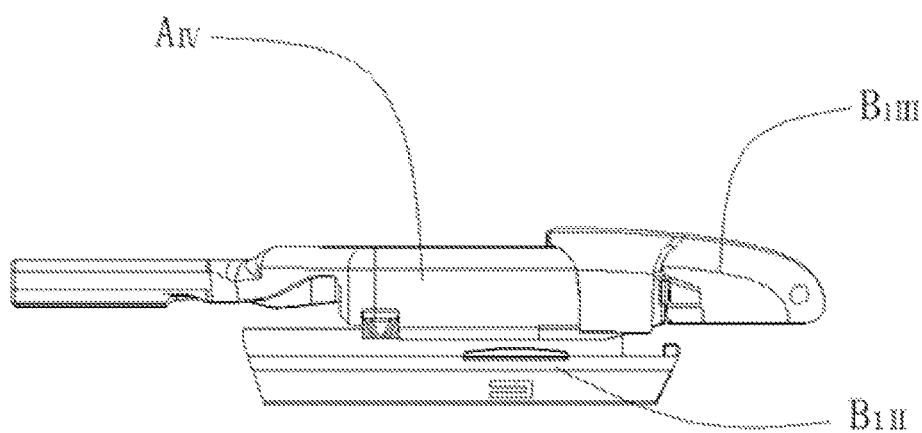
FIG. 21 is the assembly structure diagram of FIG. 20.

Scheme IV:
Match up the top lock 22 and adaptor I (B1I) with reference to FIG. 19, FIG. 20 and FIG. 21. The top lock 22 (AIV) is set with L-shaped slot (A401). Adaptor I (B1I) is set with convex block I (B104), slideway (B109) and convex block II (B110). Penetrate the L-shaped slot (A401) of top lock 22 along slideway (B109) of adaptor I (B1I). Prevent top lock 22 (AIV) from moving forward with convex block II (B110), and prevent it from moving backward with convex block I (B104) to complete the assembly.

Figure 22:
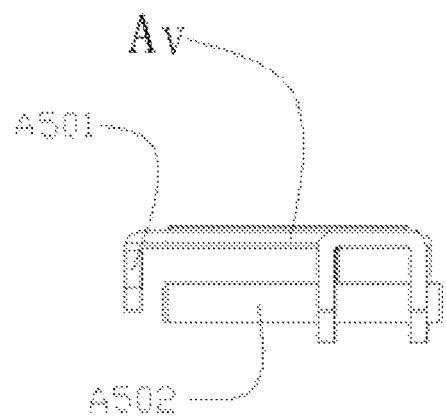
FIG. 22 is the structure diagram of side lock 22.
Figure 23:
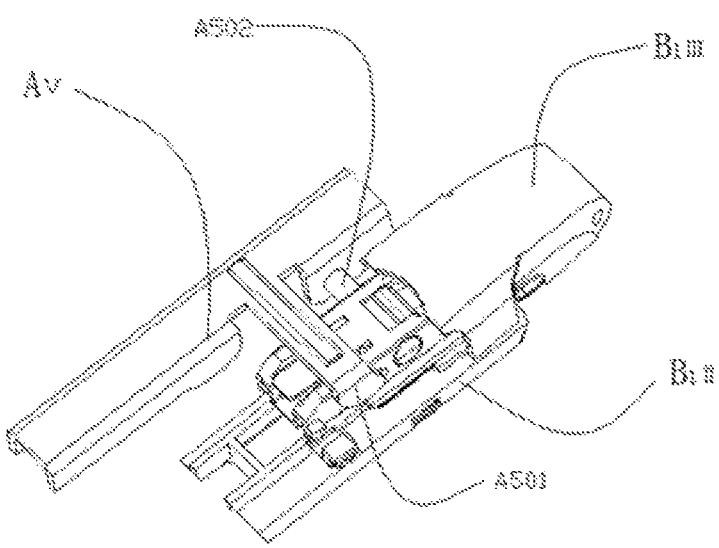
FIG. 23 is the assembly structure diagram of side lock 22 and adaptor I in scheme V.
Figure 24:
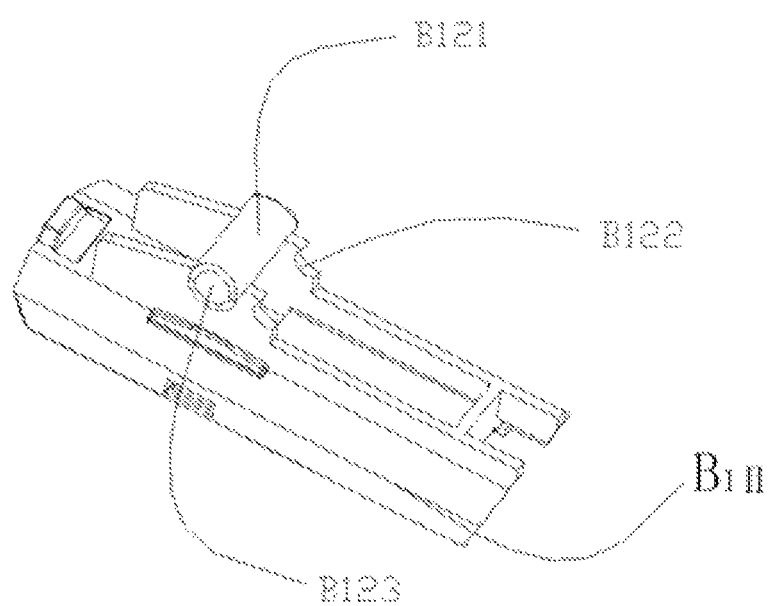
FIG. 24 is the structure diagram of holder in FIG. 23.

Scheme V:
Match up the side lock 22 (AV) and adaptor I (B1I) with reference to FIG. 22, FIG. 23 and FIG. 24. The side lock 22 (AV) is set with L-shaped hook (A501). The guide pillar (A502) is furnished below L-shaped hook (A501). Adaptor I (B1I) is designed with an adaptor I connecting hole (B101), a holder (B1II) and bearing shaft (B121). Chambers are cut at both ends of bearing shaft (B121). The guide pillar casing is set inside the bearing shaft. Press down adaptor I (B1I) with top and bottom aligning with the bearing shaft (B121) of holder (B1II). Clamp into the connecting hole (B101) of adaptor I (B1I). The assembly scheme is described as below: insert the guide pillar (A502) of side lock 22 (AV) into guide pillar casing (B123) of holder (B1II). Meanwhile, move up and down to clamp L-shaped hook (A501) of side lock 22 on adaptor I (B1I). The assembly is completed.

Figure 25:
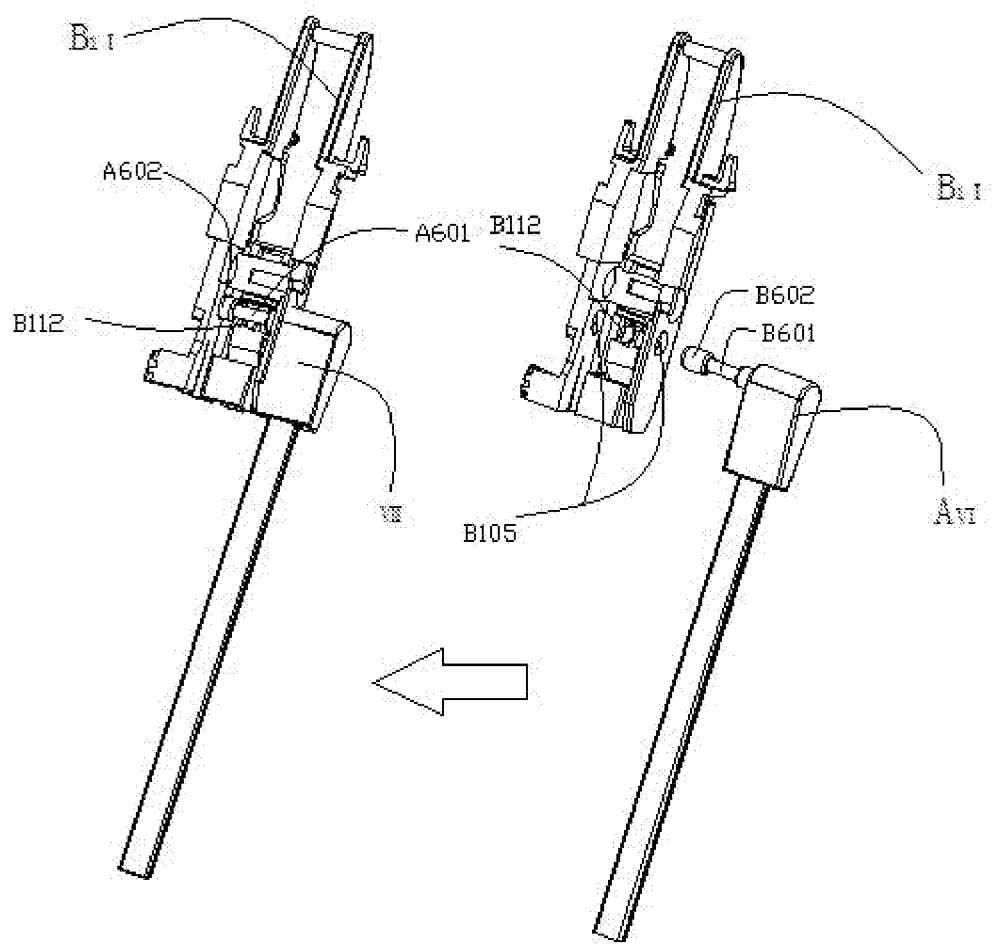
FIG. 25 is the assembly structure diagram of side pin and adaptor I in scheme VI.
Figure 26:
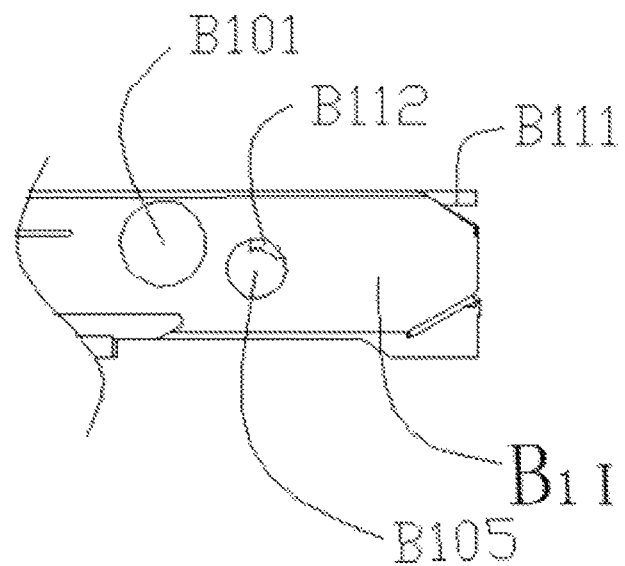
FIG. 26 is the local structure diagram of adaptor I in FIG. 25.
Figure 27:
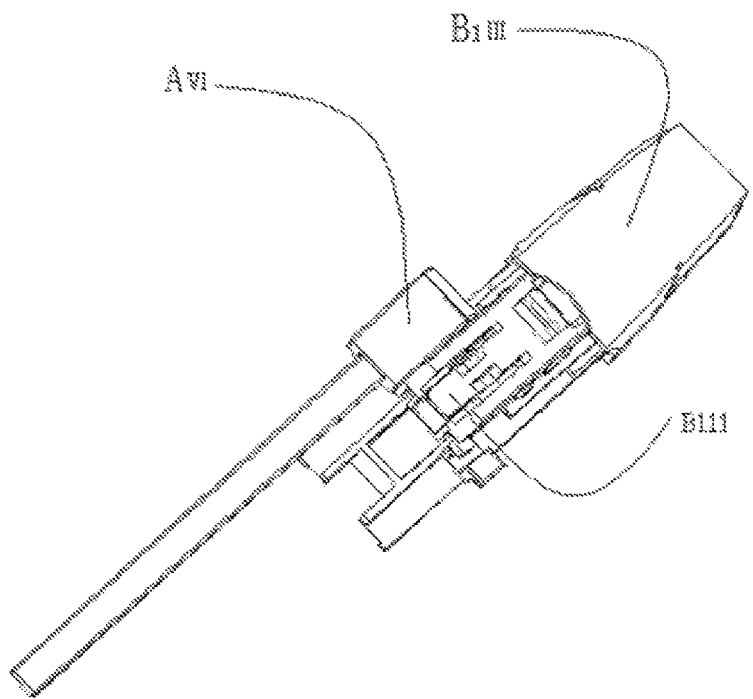
FIG. 27 is the top view of assembly structure in FIG. 25.

Scheme VI:
Match up the side pin (AVI) and adaptor I (B1I) with reference to FIG. 25, FIG. 26 and FIG. 27. The mentioned side pin (AVI) is set with shaft I (A601) at one side of the top. The connecting shaft (602) is furnished on shaft I. Adaptor I (B1I) is provided with (B105) connecting hole, (B111) pressing block and (B112) axial compression groove. The assembly scheme is described as below. Lift up the pressing block (B111) of adaptor I (B1I) to move the axial compression groove (B112) upward. Insert the connecting shaft (A602) of side pin (AVI) into connecting hole (B105).

Loose the pressing block (B111). Keep the axial compression groove (B112) clamped on the shaft (A601). The assembly is completed.

Figure 28:
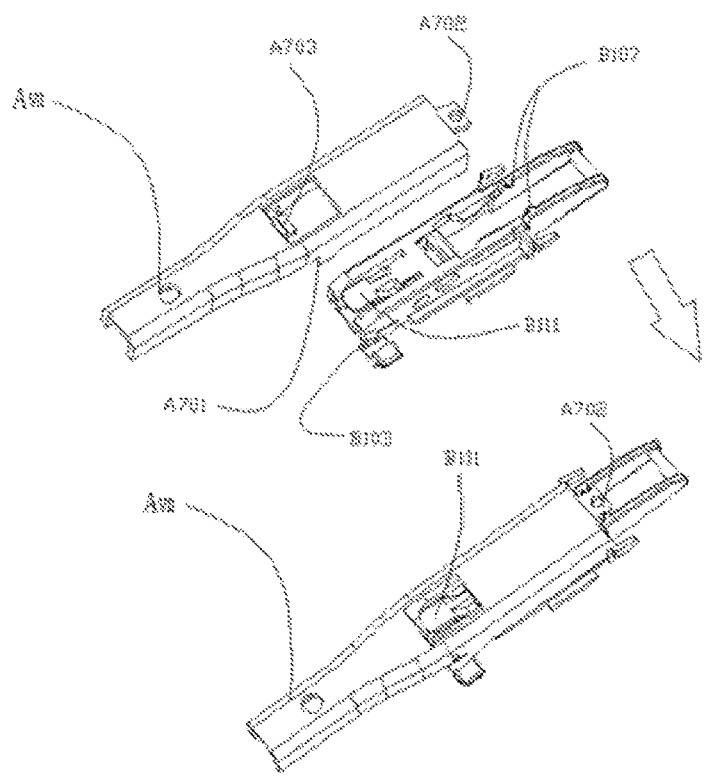
FIG. 28 is the disassembly and assembly structure diagram of pinch tab button and adaptor I in scheme VII.
Figure 29:
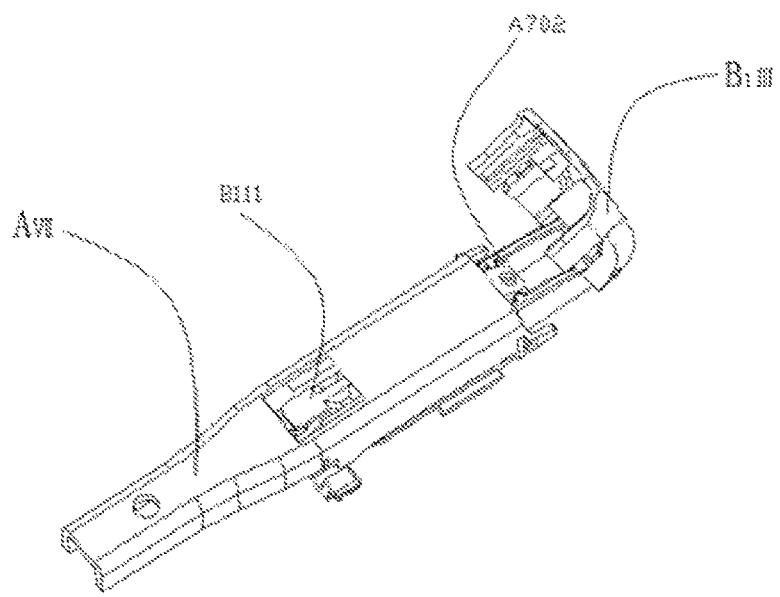
FIG. 29 is the assembly structure diagram of pinch tab button and adaptor I and adaptor cover I in scheme VII.
Figure 30:
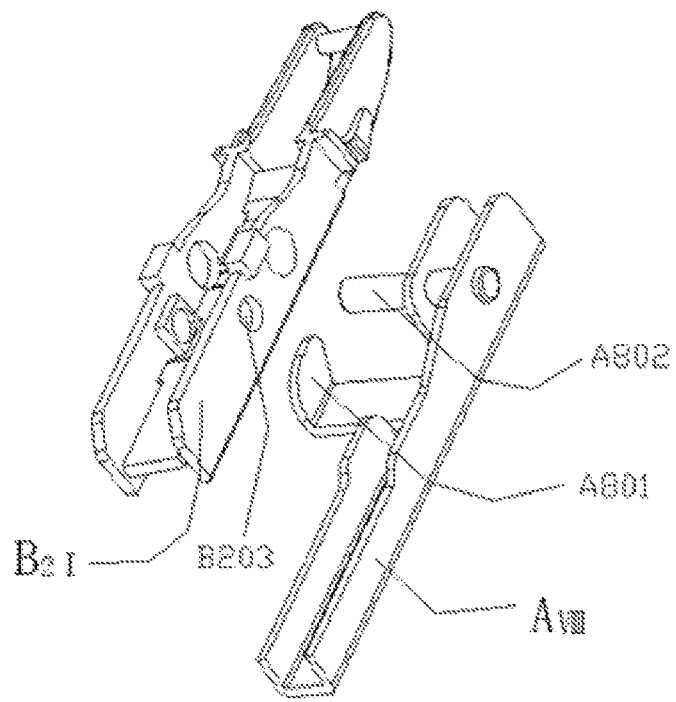
FIG. 30 is the assembly structure diagram of side lock and adaptor II in scheme VIII.

Scheme VII:

Match up the pinch tab button (AVII) and adaptor I (B1I) with reference to FIG. 28 and FIG. 29. The mentioned pinch tab button is designed with top convex block (A702), fixture block I (A703) and slot (A701). Adaptor I (B1II) is designed with convex hull (B103) and groove convex block (B107). The assembly scheme is described as below. Clamp the slot (A701) on convex hull (B103) of adaptor I (B1II). Clamp the fixture block (A703) below pressing block (B1II). Meanwhile, press down the pinch tab button (AVII) to clamp the top convex block (A702) into groove convex block (B107) adaptor I (B1II). The assembly is completed.

Scheme VIII:

Match up the side lock 17 (AVIII) and adaptor II (B2I) with reference to FIG. 12, FIG. 30, FIG. 31 and FIG. 32. The mentioned side lock 17 (AVIII) is designed with L-shaped hook (A801). Connecting shaft I (A802) is provided at one side of L-shaped hook (A801). Adaptor cover II (B2 III) is set with C-shaped shaft groove (B233) and side groove I (B231). Clamp the shaft (B201) of adaptor II (B2I) into C-shaped shaft groove (B233). Press down the adaptor cover II (B2III) to clamp the fixture block (B202) into groove (B231). The assembly scheme is described as below. Insert the connecting shaft I (A802) into (B203) shaft hole of adaptor II (B2I). Rotate the side lock 17 (AVIII) around shaft. Clamp the L-shaped hook (A801) on adaptor to prevent connecting shaft I (A802) from dropping out. It plays a role of fixation. The assembly is easy. It is available to fix firmly.

Figure 33:
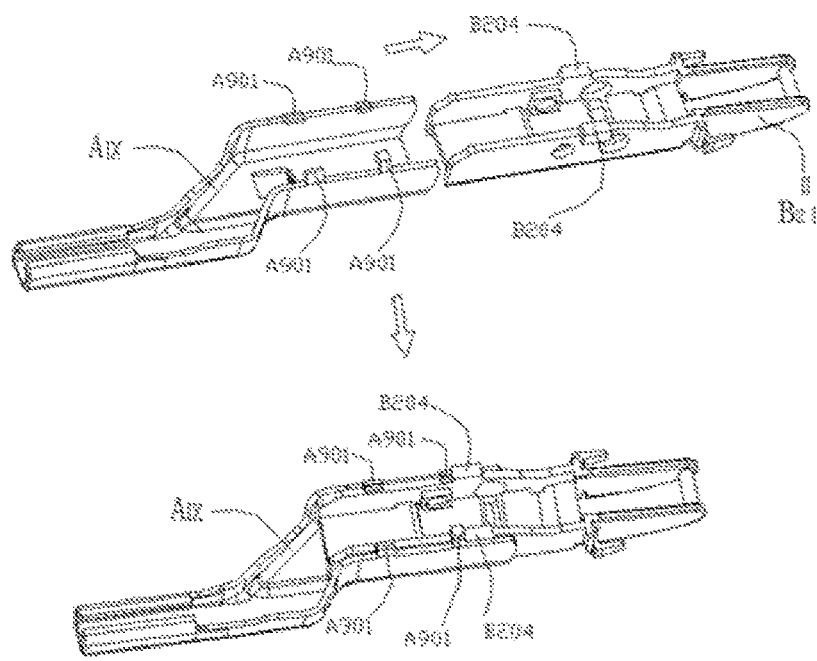
FIG. 33 is the disassembly and assembly structure diagram of top lock 16 and adaptor II in scheme IX.
Figure 34:
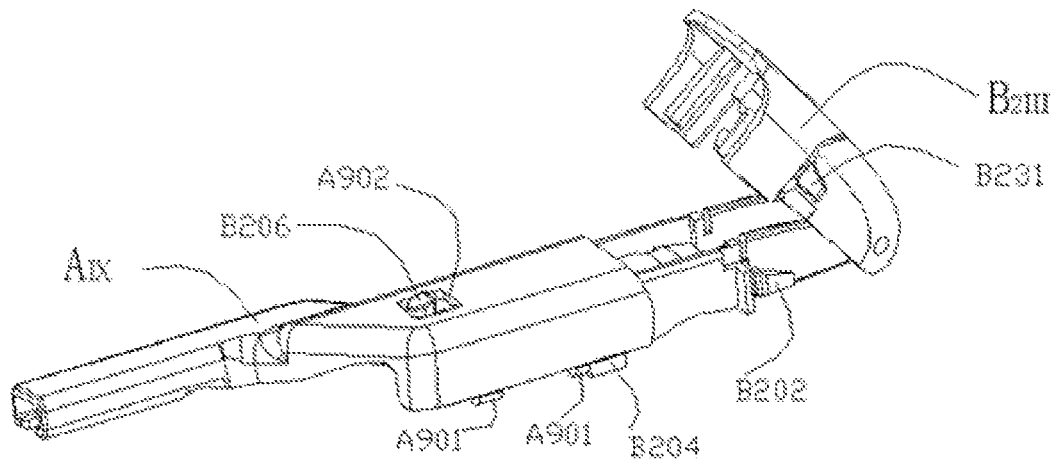
FIG. 34 is the structure diagram of opened adaptor cover II in FIG. 33.

Scheme IX:

Match up the top lock 16 and adaptor 11 (21) with reference to FIG. 33 and FIG. 34. The mentioned top lock 16 (AIX) is set with a square convex plate hole (A902). Four groups of convex hull II (A901) are provided at the bottom of hook plate joint. The assembly scheme is described as below. Penetrate the top lock 16 (AIX) into adaptor II (B2I). Prevent the top lock 16 (AIX) from moving up and down with four groups of convex hull II (A901). Prevent it from moving forward with block (B204). Clamp convex plate I (B206) into square convex plate hole (A902) to avoid dropping out. The assembly is easy and the structure is steady.

Figure 35:
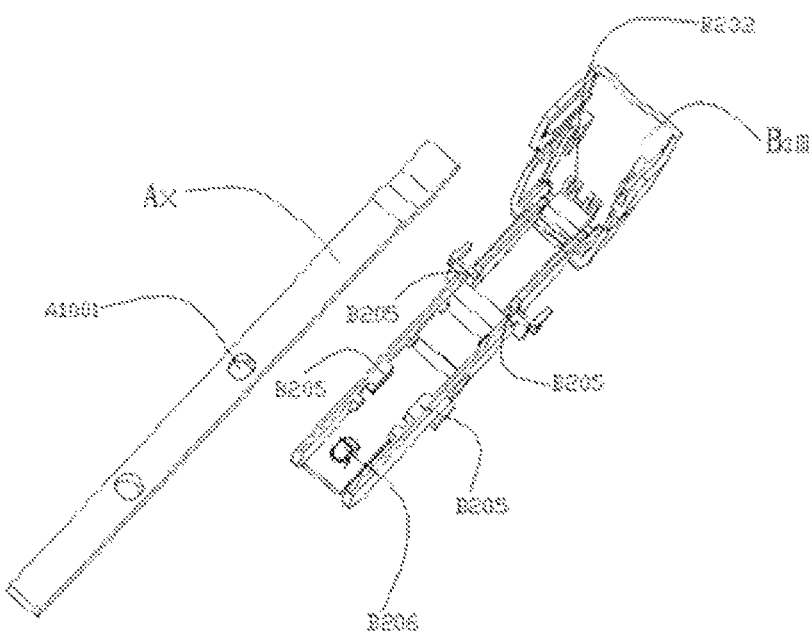
FIG. 35 is the disassembly structure diagram of bayonet and adaptor II in scheme X.
Figure 36:
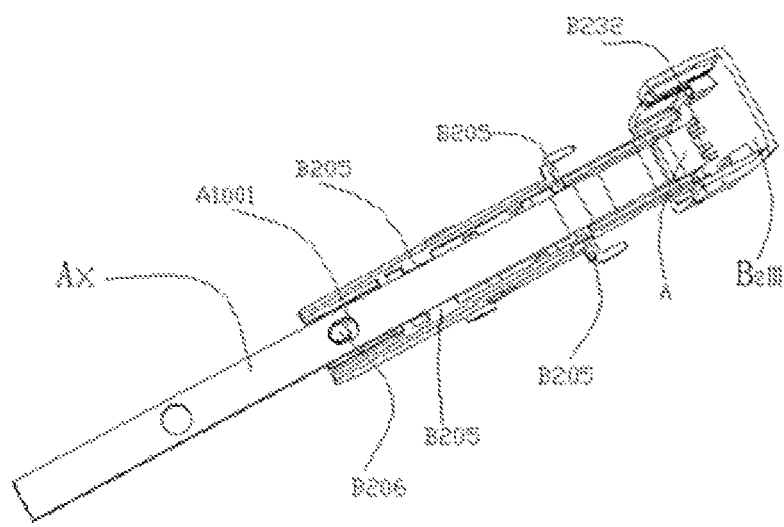
FIG. 36 is the assembly structure diagram in FIG. 35.
Figure 37:
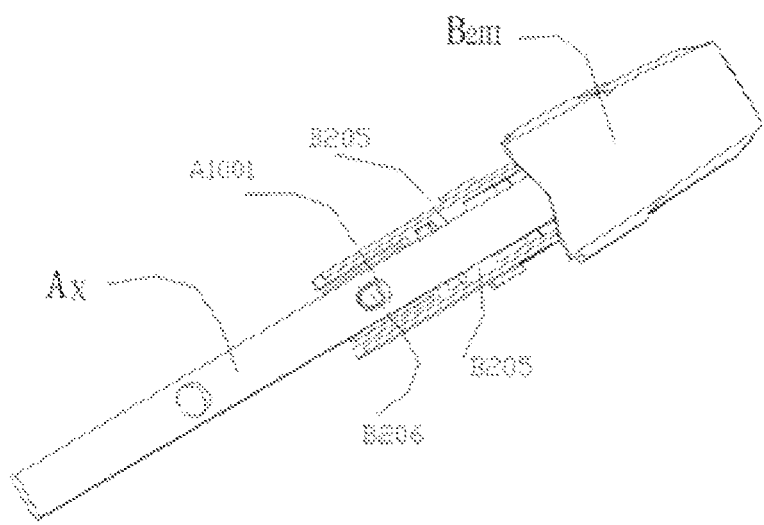
FIG. 37 is the structure diagram of closed adaptor cover II in FIG. 36.

Scheme X:

Match up the bayonet (AX) and adaptor II with reference to FIG. 12, FIG. 35 and FIG. 36. The mentioned bayonet is set with fixing hole at the top end and round convex plate hole (A1001) in the middle. Adaptor II is provided with convex plate I (B206) and convex hull (B205). Adaptor cover II of adaptor II is designed with cushion block (B232). The assembly scheme is described as below. Match up the bayonet and adaptor II (B2I). Clamp convex hull I (B206) into round convex hull hole (A1001). Prevent it from swaying left and right with the four groups of convex hull I (B205). Press down adaptor cover II (B2111) at the end. Press cushion block (B232) in the position of A to prevent moving up and down.

What is claimed is:

1. A new beam wiper structure comprising:
   a wiper joint;
   an adaptor, comprising;
     a holder connecting hole located on at least one lateral side of a middle of the adaptor;
     an adaptor shaft set at a back end of the adaptor;
     at least two adaptor buckle fixture blocks set on at least two lateral sides of the back end of the adaptor;
     at least one convex block;
     a convex hull; and
     a cushion block groove;
   an adaptor cover comprising:
     a shaft groove set at a back end of the adaptor cover;
     a cushion block set inside the adaptor cover;
     at least two side grooves on lateral sides of the adaptor cover;
     wherein the adaptor cover is removably installed on the adaptor;
   at least two buckles comprising:
     a buckle groove fitted inside the buckle;
   at least two flow deflectors comprising;
     a spring hole fitted on the flow deflector;
     a rubber groove fitted inside the flow deflector;
     a rubber with two ends wherein the rubber is penetrated into the rubber groove of the flow deflector;
     a rubber fixture block fitted on both ends of the rubber;
   a holder comprising;
     a holder convex hull set on at least two lateral sides of the bottom of the holder;
     a holder pressing block set at a back end of the holder;
     a holder spring groove fitted at a front end of the holder;
     a bearing shaft with at least two ends located at a top of the holder comprising;
       a guide pillar casing; and
       at least two chamfers with one chamfer located on each end of the bearing shaft;
       wherein the bearing shaft is of semi-hollow structure with one closed end and is clamped into the holder connecting hole of the adaptor for purposes of connecting the holder with the adaptor; and
   a spring with at least two ends comprising:
     a spring end fitted on both ends of the spring;
     wherein the spring is connected to the flow detector via the spring holes and clamped into the holder.

2. The new beam wiper structure of claim 1 wherein the adaptor comprises a second connecting hole located on at least one lateral side of the holder next to the holder connecting hole.

3. The new beam wiper structure of claim 2 comprising:
   a pressing block set at a top of the front end of the adaptor;
   a groove convex block set at the top of the at least two lateral sides at the back end of the adaptor; and
   a slideway located on a bottom lateral edge of the adaptor;
   a second convex block set outside of the slideway;
   a shaft rolling grove fitted below the second connecting hole;
   a u-shaped column fitted inside a middle part of the adaptor;
   an internal convex block located inside the middle part of the adaptor; and
   a groove convex box located at one side of the internal convex block;
   wherein the shaft of the adaptor is inserted into the groove of the adaptor cover and the adaptor cover groove rotates in coordination with the adaptor shaft so that the buckle of the adaptor is secured into the side groove my pressing down the adaptor cover.

4. The new beam wiper structure of claim 3 wherein the convex hull of the adaptor is located at the front of the adaptor and the first convex block is located on the bottom of the adaptor beneath the convex hull.

5. The new beam wiper structure of claim 4 wherein the wiper joint comprises a side lock and the side lock comprising:
- an L-shaped hook; and
- a connecting shaft located on one side of the L-shaped hook;
- wherein the connecting shaft is inserted into the shaft hole of the adaptor and the L-shaped hook is clamped on the adaptor.

6. The new beam wiper structure of claim 4 wherein the wiper joint comprises a top lock 16 comprising:
- a square convex plate hole;
- at least four groups of convex hull structure;
- wherein the top lock is penetrated into the adaptor and a top lock's vertical movement is restricted by the four groups of convex hull structure and the top lock's forward movement is restricted by the convex block and the convex plate clamped into the square convex plate hole of the top lock.

7. The new beam wiper structure of claim 3 wherein the wiper joint comprises a 9×3 U-hook wherein the 9×3 U-Hook is clamped into the U-shaped column by the adaptor and is limited and fixed by the convex block.

8. The new beam wiper structure of claim 3 wherein the wiper joint comprises a 9×4 U-hook wherein the 9×4 U-Hook is clamped into the U-shaped column by the adaptor and is limited and fixed by the convex block.

9. The new beam wiper structure of claim 3 wherein the wiper joint comprises a pinch tab wherein the pinch tab is clamped on the convex hull of the adaptor by pressing down the pinch tab to fix the convex block and groove convex block.

10. The new beam wiper structure of claim 3 wherein the wiper joint comprises a top lock wherein the top lock is furnished with an L-shaped slot, penetrated into the adaptor along the slideway, the fore and aft movement of the top lock is restricted by the convex blocks.

11. The new beam wiper structure of claim 3 wherein the wiper joint comprises:
- a pinch tab button comprising;
  - at least one slot;
- a fixture block; and
- a top convex box;
- wherein the fixture block of the pinch tab button is clamped below the pressing block of the adaptor, when the pinch tab button is pressed down the top convex block is fixed with the grove convex block.

12. The new beam wiper structure of claim 1 comprising:
- a convex plate fitted at the front end of the adaptor;
- wherein the convex hull of the adaptor is symmetrically fitted inside an upper part of the adaptor, and the convex block of the adaptor is located on the bottom of the adaptor below a convex hole and the holder connecting hole.

13. The new beam wiper structure of claim 12 wherein the shaft groove of the adaptor cover is a c-shape and the side grooves of the adaptor cover are fitted on the lateral sides of the adaptor cover.

14. The new beam wiper structure of claim 12 wherein the wiper joint comprises a bayonet, the bayonet further comprising:
- a convex plate hole, wherein the convex plate of the adaptor is clamped into the convex plate hole and the left and right movement of the bayonet is limited by the convex hull and the vertical movement is limited by pressing down on the adaptor cover and pressing the cushion block.

15. The new beam wiper structure of claim 1 wherein the wiper joint comprises a side lock wherein the side lock is inserted into the guide pillar casing of the bearing shaft of the holder and into the holder connecting hole of the adaptor.

* * * * *